Nov. 24, 1953          H. L. BOWDITCH          2,660,146
ADJUSTABLE SET POINT ARM FOR CONTROL INSTRUMENTS
Filed Aug. 30, 1952          2 Sheets-Sheet 1
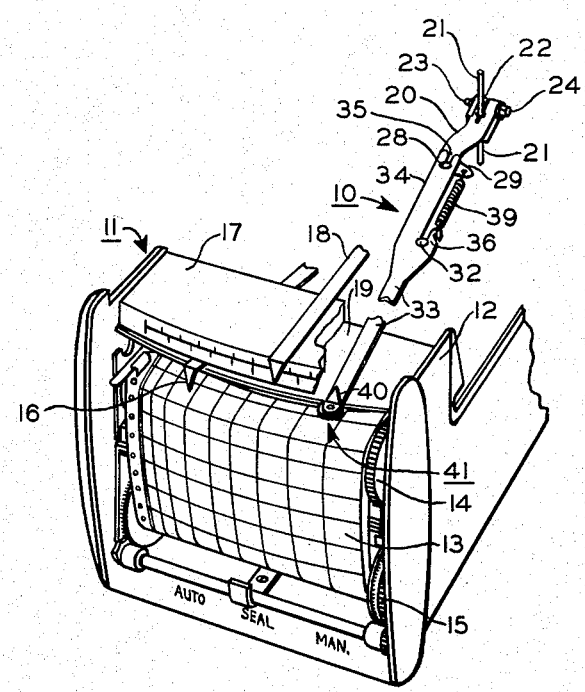
FIG. I
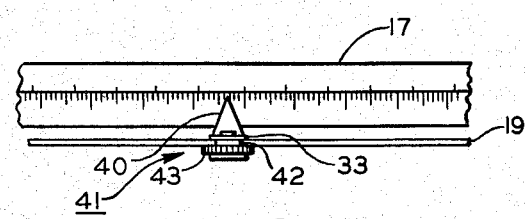
FIG. II
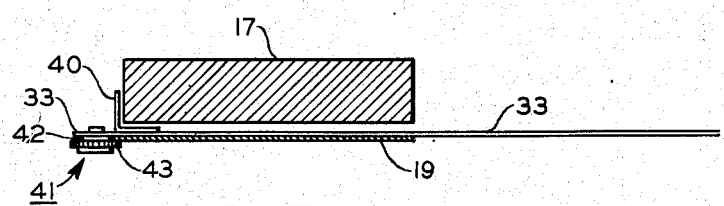
FIG. III
INVENTOR.
HOEL L. BOWDITCH
BY
*Curtis, Morris & Safford*
ATTORNEYS Nov. 24, 1953     H. L. BOWDITCH     2,660,146
ADJUSTABLE SET POINT ARM FOR CONTROL INSTRUMENTS
Filed Aug. 30, 1952     2 Sheets-Sheet 2
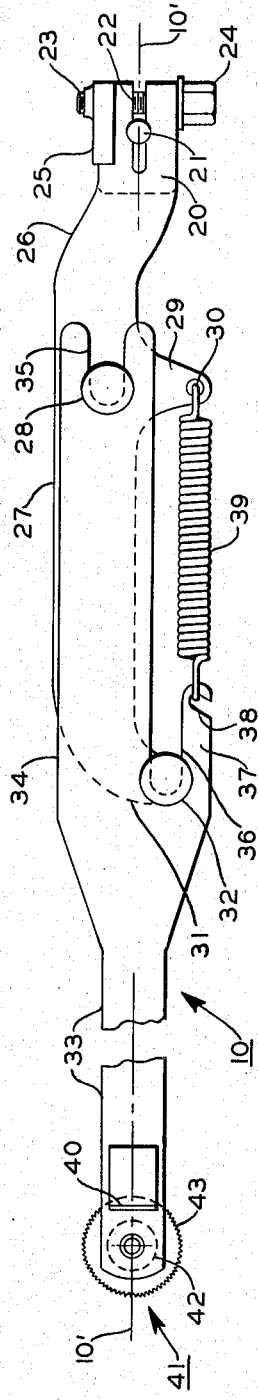
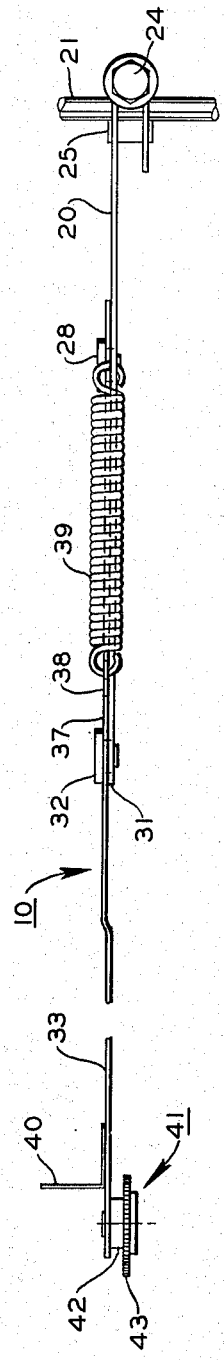
INVENTOR.
HOEL L. BOWDITCH
BY
*Curtis, Morris & Safford*
ATTORNEYS Patented Nov. 24, 1953

2,660,146

UNITED STATES PATENT OFFICE 2,660,146

ADJUSTABLE SET POINT ARM FOR CONTROL INSTRUMENTS

Hoel L. Bowditch, Foxboro, Mass., assignor to The Foxboro Company, Foxboro, Mass., a corporation of Massachusetts Application August 30, 1952, Serial No. 307,291

2 Claims. (Cl. 116—136.5)

1

This invention relates to control instruments wherein set point means is related to a variable condition by adjustment of a set point index arm. In particular, this invention relates to new and improved set point index arm structure and arrangement for use in such control instruments.

In control instruments of the type designed to control a variable condition with respect to a particular value or relation called the set point, it is usually desirable to provide an arrangement for adjustably varying the set point in order to adapt the instrument to different circumstances or conditions.

The set point means may, as an example, be a pneumatic pressure unit, and the adjustment of such a unit or a comparable one, may be accomplished by manually or otherwise adjusting a set point index arm. Such an arm may be pivoted or otherwise movable at its driven end in response to the manual drive or adjustment at its driving end. The driving end is preferably provided with an indicator element or device, in association with a calibrated set point scale.

In order to provide flexibility and adaptability in the use and operation of a control instrument, it is desirable that the set point index arm be adjustable along such a scale either in large, quick movements, or in small, accurate movements, with the further requirement that the arm be held firmly in whatever position of adjustment it finds itself. With such an arrangement, substantial set point changes may be quickly made and yet brought accurately to a precise position. Otherwise substantial losses may occur, particularly in industrial instrumentation with respect to large volume process control, or where many instruments simultaneously require set point changes.

It is an object of this invention to provide improved control instrument set point index arm structure of the type referred to above.

This and other objects of this invention will be in part pointed out and will be in part obvious from the text and claims here presented and from the accompanying drawings, in which:

Figure I is a fragmentary perspective showing of a measuring instrument incorporating a set point arm embodying this invention;

Figure II is a face view of a set point scale portion of the measuring instrument of Figure I, with the set point arm of this invention shown in relation thereto;

Figure III is a cross section view of the structure of Figure II, taken as on line III—III in Figure II;

2

Figure IV is a plan view of the set point arm of Figures I through III; and

Figure V is a side elevation of the set point arm of Figures I through IV.

Referring to Figure I, an index arm control set point unit 10 is shown in association with a control instrument portion 11. The instrument portion 11 is contained in a housing 12 with a strip chart 13 mounted therein on rollers 14 and 15 to be driven in association with a recording pen 16. This instrument is shown simply for the purpose of showing a typical application of the set point index arm unit 10. The details of the instrument are therefore not shown. Any of the usual strip chart recording structures may be used for this purpose. However, the index arm set point unit 10 is shown broken to indicate substantial length, greater than usual in control instrument index arms. This extra long index arm unit is an indication that one application of the index arm unit of this invention is its use in an instrument where the frontal face size is reduced by giving the instrument substantial depth. Desirable instrument design in such a case may dictate that the index arm units be driven from the rear of the instrument, thus requiring extra long index arm set point units.

The instrument portion 11 is shown with a double index scale block 17 mounted above the strip chart 13 and an indicator index 18 is arranged in association with one of the index scales on the block 17. The position of the index 18 may indicate the value of a factor that varies as an incident of the operation of the instrument, for example, valve position in a flow control arrangement. A set point track plate 19 is located between the block 17 and the strip chart 13, and the index arm set point unit 10 is arranged for operative engagement with the track plate 19 and association with the second scale on the scale block 17.

The index arm set point unit 10 has a driven base or stub portion 20 which is secured to a rotatable shaft 21. The shaft 21 is driven by manual adjustment of the set point unit 10, and in turn, the shaft 21 drives any suitable means, not shown, to change the set point of a controller. The driven shaft 21 is shown in a vertical position with the set point unit 10 movable by manual adjustment in a horizontal plane to drive the shaft 21. The set point unit stub 20 is generally in the form of a flat strip with one end bent in a U formation with the shaft 21 extending vertically through both legs of the U formation. As a means of clamping the stub 20 to the shaft 21, the U formation is slotted as at 22 through the base of the U to connect with both of the shaft receiving openings in the U formation. A clamp bolt 23 is provided with a head 24 bearing on one edge of the U formation. The bolt 23 extends between the legs of the U formation and between the shaft 21 and the base of the U formation. As may be seen in Figure IV, the bolt 23 is threaded into a cover plate 25 on the opposing edge of the U formation. Thus as the bolt 23 is tightened the slot 22 is narrowed and the stub 20 is clamped to the shaft 21.

Referring to Figures IV and V, the stub 20 is formed as a flat strip in a single plane throughout its extent. From the area of the stub adjacent the shaft 21, the stub strip is angled laterally as at 26 to an offset portion 27 which runs parallel to the longitudinal axis 10' of the set point arm unit as a whole. Adjacent the angled portion 26 and laterally centrally located with respect to the offset portion 27, an upright, headed guide pin 28 is secured to the stub 20. Laterally aligned with the pin 28, a generally triangular lateral finger 29 is formed on the inner edge of the offset portion 27. The finger 29 is of the same flat stock as the stub 20, and lies in the plane of the stub 20 with the base of the finger triangle along the inner edge line of the offset portion 27 and the apex of the finger triangle lying on a line perpendicular to the stub 20 and intersecting the vertical axis of the guide pin 28. The finger triangle 29 has a spring connection opening 30 adjacent its apex for a purpose to be explained later herein. The outer end of the stub 20 is provided with a narrowing taper, curved laterally inwardly across the longitudinal axis of the set point arm unit to terminate in a finger 31. A second upright headed guide pin 32 is located at the end of the finger 31. With reference to the longitudinal axis 10' of the set point arm unit 10, the first guide pin 28 is located on one side thereof, the second guide pin 32 lies on the other side, the inner edge of the stub offset portion 27 lies substantially along the axis, and the spring connection opening 30 on the lateral finger 29 is laterally further removed from the unit axis than the second headed guide pin 32.

Continuing the reference to Figures IV and V, a set point index arm 33 is assembled with the stub 20 to provide the full assembly of the index arm set point unit 10. The index arm 33 is formed as a flat strip, with a main body which is long and relatively narrow. The inner end of the index arm 33 is broadened and forms an assembly portion 34 in flat-to-flat surface assembly with the stub 20 for relative sliding movement with respect thereto. The index arm assembly portion 34 is provided with a pair of open-ended straight guide slots 35 and 36 which extend generally parallel to the longitudinal axis 10' of the set point unit 10. These slots receive the guide pins 28 and 32 respectively, with the open ends of the slots facing inwardly of the unit 10, that is, toward the driven shaft 21. The body portions of the pins 28 and 32 are in sliding fit relation with the slots 35 and 36 respectively, and the heads of the pins 28 and 32 overlie the assembly portion 34 of the index arm 33 also in sliding fit relation. These pin and slot combinations provide an essentially straight line sliding assembly relation between the index arm 33 and the stub 20.

On the index arm assembly portion 34 a finger 37 forms one side of the guide slot 36 and is provided with a spring connection slot 38. A coil spring 39 has one end detachably mounted in the slot 38 and its other end mounted in the stub opening 30. The spring 39 biases the index arm 33 along the stub 20 toward the shaft 21 to tend to move the pins 28 and 32 deeper into the slots 35 and 36 respectively. The spring 39 extends generally parallel to the longitudinal axis of the unit 10, and is offset laterally therefrom and from the pins 28 and 32. Because of this arrangement, the spring 39 tends to pivot the index arm 33 about the pin 32. This tendency minimizes lateral play in the pin and slot arrangements and insures an assembly of the index arm 33 and the stub 20 with definiteness and duplication of alignment and of operative dimension when disassembled and reassembled or when one of the parts is replaced by a substitute therefor.

Referring now to Figure I, the purpose of the spring biased sliding assembly of the index arm 33 and stub 20 is twofold. It provides a simple means of detaching the index arm for repair or replacement. Further, as described below, it provides a spring bias to urge the outer end of the index arm into engagement with the outer edge of the track plate 19. The index arm lies between the track plate 19 and the scale block 17.

Now referring to Figures II through V, the outer end of the index arm is provided with an upstanding pointer 40, for association with the lower scale on the scale block 17. The outer end of the index arm is, further, provided with a two diameter roller unit 41. This roller is mounted on the index arm, depending therefrom, for rotation about an axis perpendicular to the index arm. A small diameter portion 42 has a smooth periphery in spring biased frictional engagement with the front edge of the track plate 19 under the biasing action of the index unit spring 39. A larger diameter portion 43 has a knurled periphery to facilitate manual adjustment of the roller unit 41 along the front edge of the track plate 19. With this arrangement, the whole index arm 10 may be moved in substantial steps of adjustment by pushing the roller unit 41 bodily along the track plate. Also, the whole index arm 10 may be moved in minute steps of adjustment by rotating the roller unit 41 along the track plate.

This invention, therefore, provides a novel measuring instrument set point index arm unit.

As many embodiments may be made in the above invention, and as many changes may be made in the embodiment above described without departing from the spirit and scope of the invention as described herein and shown in the accompanying drawings, it is to be understood that all matter hereinbefore set forth or shown in the accompanying drawings is to be interpreted as illustrative only and not in a limiting sense.

I claim:

1. In a control instrument, an index arm assembly for adjustment along a track to provide a set point in relation to a variable condition, said assembly comprising, in combination, a driven stub, an arm for driving said stub, cooperating pin and slot connection arrangements joining said arm and said stub for straight line sliding movement of said arm with respect to said stub, a spring connecting said arm and said stub between points offset laterally from the longitudinal axis of said assembly to provide a bias on said arm in one direction of said movement and to take up lateral play in said pin and slot arrangements, and an adjustment member for moving said arm unit with respect to an index scale to drive said stub, said adjustment member comprising a roller rotatably mounted on said arm, said roller having a small diameter spring biased for frictional engagement with said track in association with said index scale and with the bias of said engagement provided by said biasing spring, and said roller having a larger diameter for manual rotation of said roller along said track to provide small movements of said arm along said track and for manual bodily sliding movement of said roller on said track to provide substantial movements of said arm along said track.

2. In a control instrument, a two part index arm unit for adjustment along a track to provide a set point in relation to a variable condition, said unit comprising, in combination, a driven stub, an arm for driving said stub, cooperating pin and open end slot connection arrangements detachably joining said arm and said stub for straight line sliding movement of said arm with respect to said stub, a detachable spring connecting said arm and said stub between points offset laterally from the longitudinal axis of said assembly to provide a bias on said arm in one direction of said movement and to take up lateral play in said pin and slot arrangements, an index point on said arm for cooperation with an index scale, and an adjustment member for moving said arm with respect to said index scale to drive said stub, said adjustment member comprising a roller rotatably mounted on said arm, said roller having a small diameter spring biased for frictional engagement with said track in association with said index scale and with the bias of said engagement provided by said biasing spring, and said roller having a larger diameter for manual rotation of said roller along said track to provide small movements of said arm along said track and for manual bodily sliding movement of said roller on said track to provide substantial movements of said arm along said track.

HOEL L. BOWDITCH.

References Cited in the file of this patent

UNITED STATES PATENTS

| Number | Name | Date |
|---|---|---|
| 2,584,958 | Williams | Feb. 5, 1952 |

FOREIGN PATENTS

| Number | Country | Date |
|---|---|---|
| 683,395 | Germany | Nov. 6, 1939 |